United States Patent [19]

Järvenpää

[11] 4,102,658

[45] Jul. 25, 1978

[54] APPARATUS FOR CONTACTING A GAS WITH A LIQUID

[76] Inventor: Viljo Juhana Järvenpää, Vellamontie 21 as 6, 04200 Kerava, Finland

[21] Appl. No.: 715,211

[22] Filed: Aug. 17, 1976

[30] Foreign Application Priority Data

Aug. 18, 1975 [FI] Finland .................................. 752333

[51] Int. Cl.² .............................................. B01D 47/00
[52] U.S. Cl. .................................. 55/230; 55/257 R; 55/406; 261/89
[58] Field of Search ..................... 55/230, 257 R, 228, 55/406; 261/89, 90, 28

[56] References Cited

U.S. PATENT DOCUMENTS

| | | | |
|---|---|---|---|
| 1,408,736 | 3/1922 | Hernu | 55/230 |
| 2,396,526 | 3/1946 | Nilsson | 26/89 |
| 3,194,544 | 7/1965 | Jamison et al. | 55/230 |
| 3,645,070 | 2/1972 | Roe | 55/230 |

FOREIGN PATENT DOCUMENTS 9,618 of 1914 United Kingdom ................... 55/407

*Primary Examiner*—Bernard Nozick
*Attorney, Agent, or Firm*—Steinberg & Blake

[57] ABSTRACT

A device for placing a gaseous fluid in contact with a washing liquid for purposes such as removing gaseous components and/or solid impurities which are present in the gaseous fluid and/or cooling the gaseous fluid. A tubular receiving enclosure is provided for receiving the gaseous fluid, this tubular receiving enclosure having an outer tubular wall and an end wall fixed to and extending across the tubular wall and formed with an opening passing therethrough. An internal blower is situated within the tubular receiving enclosure adjacent the end wall thereof for separating droplets of liquid from the fluid in the tubular enclosure. An external blower is situated adjacent the end wall of the tubular enclosure at the exterior thereof, this external blower being coaxial with the internal blower and having a diameter larger than the diameter of the internal blower. The external blower is adapted to discharge clean gas. A tubular connector extends between and is connected to the internal and external blowers, communicating with both of these blowers and passing through the opening in the end wall so that gas will flow from the internal blower through the tubular connector to the external blower in order to be discharged by the latter.

6 Claims, 9 Drawing Figures

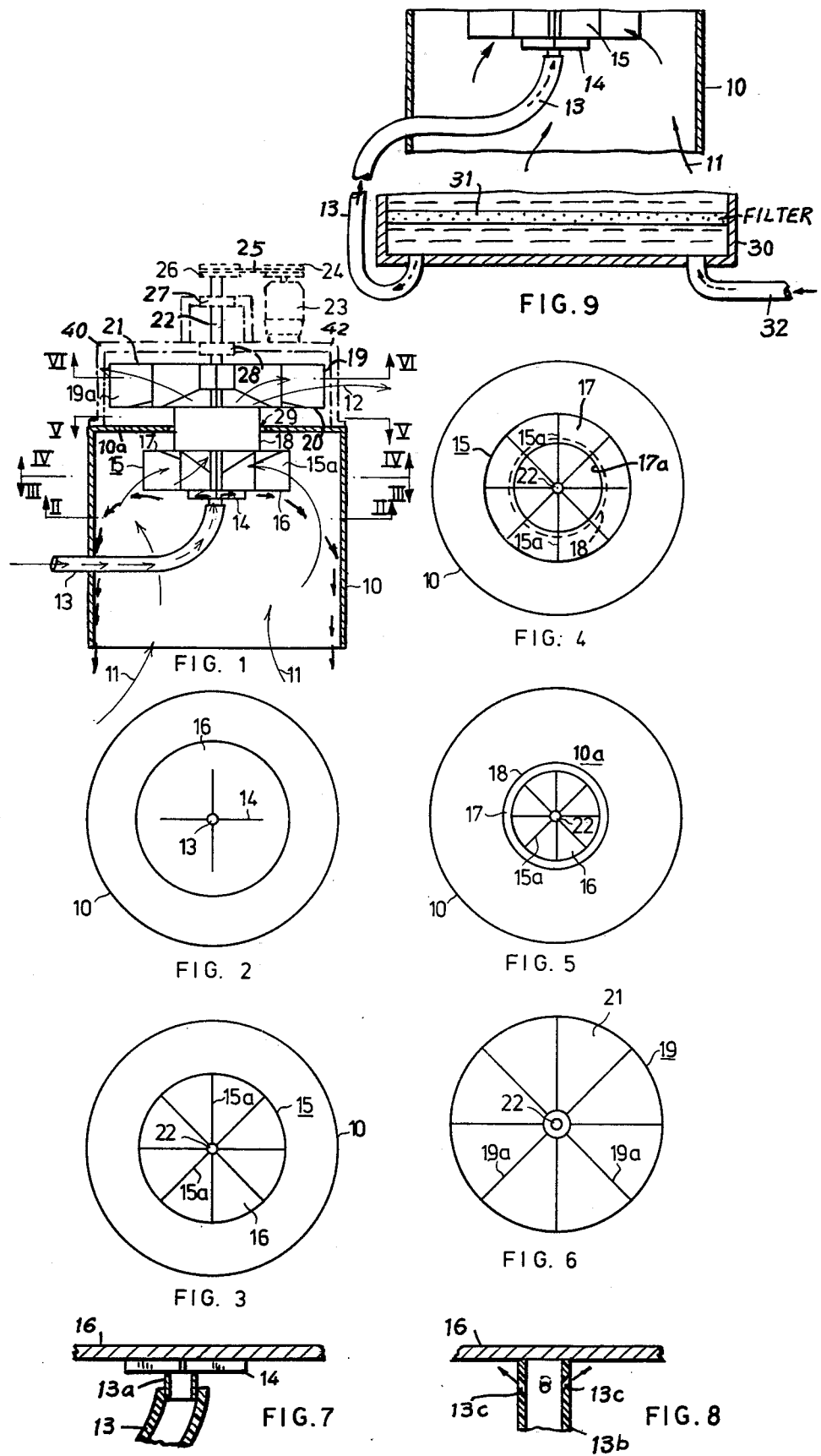

APPARATUS FOR CONTACTING A GAS WITH A LIQUID

BACKGROUND OF THE INVENTION

The present invention relates to devices for placing a gaseous fluid in contact with a washing liquid for purposes such as removing gaseous components and/or solid impurities from the gaseous fluid as well as for purposes such as cooling the gaseous fluid.

As is well known, flowing gaseous fluid frequently contains impurities in the form of gaseous components as well as solid particles, and these impurities must be removed before the fluid is discharged or reused. In practice, situations are often encountered where the gaseous fluid contains so much solid components that it is advisable to remove the latter before the gaseous fluid enters a washer or scrubber.

Numerous wet washer or scrubber designs for gaseous fluids are known. Many of these employ so-called filler beds through which the gaseous fluid must pass either so that washing liquid encounters the gaseous fluid in a counterflow arrangement or so that the washing liquid is in the form of a jet which flows concurrently with the gaseous fluid. While such designs are considered as operating satisfactorily, they have the drawbacks of clogging the filler beds and requiring an exceedingly large space.

Also, so-called diffuser washers or scrubbers are commonly used, wherein by reducing the width of the tube or duct through which the gas flows, a Venturi is formed accelerating the gas flow to provide a high velocity for the gas while at the same time the washing liquid is fed into the flowing gas to achieve a good contact between the flowing gas and the washing liquid. Designs of this type require large amounts of power, and in addition they are expensive with respect to the cost of the apparatus.

There are also so-called S-wave washers which are utilized as wet washers wherein the washing liquid and the gaseous fluid both enter a passage formed by an S-shaped tube, so that the gas and washing liquid are contacted with each other by way of such a construction. One of the known embodiments of this type is such that the gas flow which is to be purified is brought into contact with a foaming washing liquid, the gas being required to pass through a foam bed, whereupon a drop separation which is as complete as possible is provided.

One step which is performed by every wet washer is the separation of droplets from the gaseous flow, inasmuch as in connection with the washing operations droplets are invariably formed and these droplets must be removed from the gas. The number of such droplets which are formed is of course greater, the more complete the contact between the gas and the washing liquid. On the other hand, of course, a large number of droplets is desirable inasmuch as the impurities present in the gaseous flow are of necessity bound to these droplets. The drop separator is therefore connected subsequent to the wet washer at an appropriate location, usually in advance of the blower. Various types of devices are provided to perform the operations of drop separators, such as traps, grills which rapidly change the direction of flow, or certain types of designs which are formed with grooves. Also, filter mats are used as droplet separators. All of the above constructions, however, have the drawback that the liquid droplets clog the drop separator, with the result that impurities escape undesirably or there is an insufficient separation of droplets. There are also known prior art drop separators wherein the gas flow becomes so slow that droplets become separated, for example, on the walls of the column. Cyclone separators also have been used for the purpose of droplet separation. All of the above mentioned washer-droplet separator designs have large dimensions, while creating one particular problem with respect to the washing or scrubbing operations and a second particular problem with respect to the separation of droplets.

SUMMARY OF THE INVENTION

It is accordingly a primary object of the present invention to provide a construction which will avoid the above drawbacks.

In particular it is an object of the present invention to provide a device which is more efficient than previously known devices for removal of gaseous components and/or solid impurities present in a gaseous fluid.

It is in particular an object of the present invention to provide a device wherein a washer and droplet separator are combined, while a blower construction is provided for producing the gas flow in a manner which is new and more efficient than with previous designs so that above all droplet separation is positively assured.

Yet another object of the present invention is to provide a device of the above type which has an extremely small size while being extremely simple as well as more economical than previously known devices with respect to costs, while nevertheless the device of the invention is capable of surpassing the separation efficiency of most of the previously known wet washers.

A further object of the present invention is to provide a device which can also operate as a cooler for the flowing fluid.

The device of the invention includes a tubular receiving means for receiving the gaseous fluid which is to be contacted with a washing liquid, this tubular means having an outer tubular wall and an end wall connected to and extending across the outer tubular wall and formed with an opening passing therethrough, this end wall being situated at the end of the tubular receiving means opposite from the entrance end thereof through which the gaseous fluid enters the tubular receiving means. Situated within the tubular receiving means adjacent its end wall is an internal blower means which acts as a droplet separator, while an external blower means is situated outside of the tubular receiving means adjacent the end wall thereof. The external blower means is coaxial with the internal blower means and has a diameter larger than that of the internal blower means. A connecting tubular means or the equivalent thereof is connected to and extends between the internal and external blower means, passing through the opening in the end wall of the tubular receiving means. This connecting tubular means or the equivalent thereof communicates at one end with the internal blower means and at its opposite end with the external blower means so that gas from which droplets have been separated by the internal blower means will be drawn into the external blower means through the connecting tubular means and will be discharged by the external blower means.

The device of the invention is most suitable for mounting in a cyclone, in which case the gaseous fluid flow which enters the tubular receiving means is primarily purified prior to being contacted by washing liquid in the tubular receiving means. With the device of the invention, according to which the washer is combined with a small-diameter blower operating as a droplet separator and a large diameter blower producing the fluid flow, the blowers and tubular connecting means therebetween form a single unit connected with a single drive shaft and operates above all to insure that droplet separation is complete. Moreover, with the structure of the invention there is an assurance that the gas has been dried of its contents of washing liquid before it enters the large-diameter blower at the exterior of the tubular receiving means. Because the device of the invention has an extremely small size it is capable of handling even extremely large gas quantities in an operating space which can be quite small if necessary.

BRIEF DESCRIPTION OF DRAWINGS

The invention is illustrated by way of example in the accompanying drawings which form part of this application and in which:

FIG. 1 is a schematic partly sectional elevation of one possible embodiment of a device according to the invention;

FIGS. 2–6 are respectively schematic single-line representations of the structure of FIG. 1 respectively taken along lines II—II, III—III, IV—IV, V—V, and VI—VI in the directions of the arrows;

FIG. 7 is a fragmentary schematic sectional elevation of part of the structure of FIG. 1;

FIG. 8 is a schematic fragmentary sectional elevation showing a different embodiment of the structure shown in FIG. 7; and FIG. 9 is a schematic partly sectional elevation illustrating how washing liquid is circulated.

DESCRIPTION OF PREFERRED EMBODIMENTS

Referring to FIGS. 1–7, in the illustrated embodiment there is schematically shown a gaseous fluid flow 11 for the gaseous fluid which is to be treated with the structure of the invention, this gaseous fluid flow 11 entering into the tubular receiving means 10 through the lower open end thereof which is illustrated in FIG. 1. This tubular receiving means 10 has an outer tubular wall, the bottom end of which is open as illustrated in FIG. 1, while at the top end of the outer tubular wall the tubular receiving means 10 has an end wall 10a fixed to and extending across the outer tubular wall and formed with a central opening 29. Thus, the end wall 10a is at the end of the tubular receiving means 10 distant from the open receiving end thereof. This tubular receiving means 10 may most appropriately form the central tube of a cyclone separator, but in general it may be considered as any tubular space throttled by an orifice such as the opening 29 at the end opposite the open receiving end.

Washing liquid is supplied by way of a washing-liquid supply pipe means 13 wherein the washing liquid flows as indicated by arrows in FIG. 1 to the upper discharge outlet of the supply pipe means 13. This discharge outlet of the supply pipe means 13 is situated closely adjacent to a plurality of distributor vanes 14 which are fixed to the lower end plate 16 of an internal blower means 15. The distributor vanes 14 are fixed to each other at the center of the end plate 16 and radiate uniformly from the center of the end plate 16, as shown in FIG. 2. As is apparent from FIG. 7, the supply pipe means 13 terminates in a discharge outlet 13a, the top end of which is closely adjacent to the bottom edges of the distributor vanes 14.

The internal blower means 15, which acts as a droplet separator, has a series of blower vanes 15a, the bottom edges of which are fixed as by welding, for example, to the upper surface of the outer end plate 16, and the upper edges of the vanes 15a are fixed, as by welding, to a flat inner circular plate or ring 17. Thus, the ring 17 has a central opening formed by its inner peripheral edge 17a (FIG. 4) and this circular plate or ring 17 is coaxial with the end plate 16 and has an outer diameter equal to the outer diameter of the plate 16. The manner in which the vanes 15a are distributed with respect to the end plates 16 and 17 of the internal blower means 15 is most clearly apparent from FIGS. 3 and 4.

The central aperture of the ring 17, defined by the inner edge 17a thereof, communicates with the interior of a connecting tubular means 18 in the form of a tube of circular section which is fixed coaxially to the ring 17, as by welding, just outwardly beyond the inner peripheral edge 17a of the ring 17. This tubular connecting means 18 passes through the opening 29 and is fixed at its upper edge, as viewed in FIG. 1, to a lower or inner end plate 20 of an external radial blower means 19 which is coaxial with the connecting tubular means 18 and the internal blower means 15. This end plate 20 of the external blower means 19 is also in the form of a ring similar to the ring 17. Thus the ring 20 has an internal peripheral edge identical with the internal peripheral edge 17a and situated coaxially in alignment therewith, the top end of the tube 18 being welded to the exterior lower surface of plate 20 just outwardly beyond the internal peripheral edge thereof which forms an opening through which gas enters from the tube 18 into the blower means 19. However, the outer peripheral edge of the end plate 20 is of a greater diameter than the diameter of the blower means 15 and more particularly of the plates 16 and 17 thereof, as is apparent from FIG. 1. The blower means 19 includes a plurality of vanes 19a which are fixed to the upper surface of the ring 20, as by being welded thereto, and the vanes 19a are welded at their top edges to the lower surface of an outer end plate 21 in the manner most clearly apparent from FIG. 6. The outer diameters of the plates 20 and 21 are equal to each other, and these plates are of course coaxial with respect to each other and with respect to the tube 18 and internal blower means 15. Thus, the internal and external blower means 15 and 19 are situated adjacent the end wall 10a inside and outside the tubular receiving means 10, respectively, while being interconnected by the connecting tubular means 18 which provides communication between the blower means 15 and 19. Of course, the tubular connecting means 18 is relatively short and the internal blower means 15 and external blower means 19 are situated adjacent the end wall 10a. The exterior diameter of the tubular means 18 is only slightly smaller than the diameter of the opening 29 and through a suitable fitting which is not illustrated passes fluid-tightly through the opening 29 while being rotatable with respect to the stationary tubular receiving means 10.

The above structure of the invention wherein the droplet separator formed by the internal radial blower means 15 and the external radial blower means 19 consist of blower impellers having central suction regions or apertures which are opposite each other with the connecting tube 18 being the common suction tube for the droplet separator 15 and the blower 19, forms in its entirety a single unit operatively connected with a single rotary driving shaft 22 which extends along the common axis of the internal blower means 15, the connecting tubular means 18, and the external blower means 19, while being fixed to the blower means 15 and 19, as is apparent from the drawings. This single rotary drive shaft 22 is driven by a drive means which may take the form of the illustrated motor 23 which through pulleys 24 and 26 and a belt 25 drives the shaft 22 which is supported for rotation by way of the bearings 27 and 28. These bearings as well as the drive means formed by the motor 23 and transmission 24-26 are shown in phantom lines in FIG. 1 inasmuch as this structure may take any one of many different forms. Thus, the shaft 22 may be driven by other known transmission mechanisms. Rigid narrow brackets 40, 42 are fixed to wall 10a and support bearings 27, 28 and motor 23 in the manner illustrated.

With the structure as described above and shown particularly in FIG. 1, the gaseous fluid flow 11 passes first into the interior of the tubular receiving means 10 through the open lower end thereof and then through the spaces between the vanes 15a of the internal blower means 15 wherein liquid droplets are separated, the gas flowing radially from the outer periphery toward the center of the internal blower means 15 and then flowing upwardly through the opening at the center of the ring 17 into the tubular connecting means 18. From the interior of the tubular connecting means 18 the gas flows to the central region of the exterior blower means 19, being acted upon by the impeller thereof so as to be directed outwardly through the spaces between the vanes 19a of the external blower means 19. This discharged gas which has been cleaned and dried is indicated as flowing in the direction shown by the arrows 12 in FIG. 1. Thus, the fluid flow 11 acquires a flow direction from the droplet separator formed by the internal blower means 15 toward the external blower means 19 and out through the latter, this flow resulting from the fact that the blower means 19 has a diameter larger than that of the droplet separator 15.

The washing liquid supplied by the supply pipe means 13 is discharged to the distributor vanes 14, and the rotation derived from the shaft 22 results in flinging the washing liquid from the vanes 14 outwardly to the inner surface of the outer tubular wall of the tubular receiving means 10. The gaseous fluid flow 11 is in this way compelled to pass through an umbrella of washing liquid in the form of a relatively powerful jet, so that the gaseous fluid is thoroughly wetted. Inasmuch as the washing liquid flows downwardly along the inner surface of the outer tubular wall of the tubular receiving means 10, the entering fluid flow 11 also must pass through the washing liquid falling from the inner surface of this outer tubular wall at the bottom entrance end of the tubular receiving means 10. Thus in this way also the extent to which the gaseous fluid flow is wetted is increased.

The substantially completely wetted fluid flow 11 thus enters subsequent to the above treatments the droplet separator 15, and with normal rotational speeds of gas flow blowers, the vanes 15a of the internal blower means will provide a centrifugal force acting on the liquid droplets and having a magnitude which surpasses atmospheric pressure by several times, so that in this way the gaseous fluid flow 11 is purified of its liquid droplets up to the saturation limit. This saturation limit in turn depends upon the temperature and the gas pressure of the washing liquid. Thus it will be understood that the vanes 15a of the droplet separator 15 fling the liquid droplets outwardly into engagement with the inner surface of the outer tubular wall of the tubular receiving means 10, while the fluid flow 12 discharging from the vanes 19a of the external blower means 19 is not only washed clean of impurities but is also dried so as to be free of washing liquid. All of the above treatments have been brought about by way of the single rotating unit of the invention formed by the combination of the above internal and external blower means and connecting tubular means 18, with this single unit being driven by the single drive shaft 22, and in addition there has been imparted to the fluid flow 11 a sufficient flow velocity and differential pressure, produced either before or after the washer of the invention in the pipe system for the fluids.

Recovery of the washing liquid as it flows downwardly from the tubular receiving means 10 may take place either in a known way or more advantageously in that the washing-liquid supply pipe means 13 and the distributor vanes 14 cooperate together by way of their design and cooperative relationship to produce a suction effect which is similar to the suction of a centrifugal pump. Thus, as may be seen from FIG. 7, as the washing liquid discharges out of the discharge outlet 13a, it is impelled outwardly by the distributor vanes 14 to create a suction similar to that achieved the impeller of a centrifugal pump, and in this way it is possible to utilize this suction action to act as a pump for providing a circulating path for the washing liquid.

Thus, as is shown schematically in FIG. 9, the liquid which falls from the inner surface of the outer tubular wall of the tubular receiving means 10 is received in a tank 30, this liquid passing first through a suitable filter 31 before reaching the bottom of the tank 30 which communicates in the manner illustrated in FIG. 9 with the supply pipe means 13. Thus because of the above cooperation between vanes 14 and the discharge outlet 13a of the pipe means 13, creating the action of a centrifugal pump, the washing liquid which reaches the bottom of the tank 30 will be automatically sucked back into the pipe 13 to be discharged again against the lower surface of the end plate 16 to be acted upon by the distributor vanes 14. Instead of a simple filter 31 it is possible to provide in the tank 30 in a known way suitable settling cells which receive the washing liquid and in which the impurities settle while the cleaned washing liquid overflows these cells to reach the bottom of the tank 30. Through pipe 32 there is a supply of additional liquid required for pipe 13 and for backwashing filter 31 from time to time.

The structure of the present invention shown in the drawings and described above is primarily presented in principle, while for any particular application there may be additional details based upon this principle. However, the design according to the invention is particularly appropriate for application to a cyclone separator where the coarsest components of the fluid flow have already been settled out of the gaseous fluid prior to washing thereof. However, the device of the invention can equally well be mounted, for example, at the top of evaporator columns. Thus, there are numerous other details which may be associated in principle with the design of the present invention. For example, as shown in FIG. 8, it is possible to provide a washing-liquid supply pipe means 13b which has a discharge outlet in the form of inclined bores 13c illustrated in FIG. 8 and forming spray nozzles through which the washing liquid is forcefully sprayed against the bottom surface of the end plate 16 of the internal blower means 15. In this way a construction which to some extent is the equivalent of that shown in FIG. 7 may be provided. The spray discharge 13c shown in FIG. 8 is of course concentric with the shaft 22 and the rotating droplet separator 15. However, the design of FIG. 8 is less preferable than that described above inasmuch as it does not achieve a sufficiently efficient liquid spray, whereas the distributor vanes 14 will reliably cause the washing liquid to be directed outwardly into engagement with the inner surface of the outer tubular wall of the tubular receiving means 10.

While certain favorable embodiments of the invention have been set forth above, it is obvious that based upon the principles of the present invention various modifications are possible. The impeller diameter of the vanes of the droplet separator formed by the internal blower means, as compared with that of the blower vanes of the external blower means may be varied so that these diameters will have a particular relationship as required in a given application. However, the external blower means will of course always have a diameter greater than the internal blower means to assure the desired direction of flow as set forth above. The diameter of the impeller formed by the distributor vanes 14 also may be varied in order to achieve desired results. The particular design of the present invention may also be utilized for the purpose of cooling liquid such as that supplied by the supply pipe means 13, and such use of the invention is particularly favorable because the consumption of cooled or cooling liquid will be minimal as a result of the efficiency of the droplet separation achieved with the invention.

What is claimed is:

1. In a device wherein a gaseous fluid is brought into contact with a washing liquid for purposes such as removal of gaseous components and/or solid impurities from the gaseous fluid and/or cooling the gaseous fluid tubular receiving means for receiving the gaseous fluid and including means for placing the latter in contact with a washing liquid in the interior of said tubular receiving means, said tubular receiving means having an inlet through which the gaseous fluid enters into said tubular receiving means, and said tubular receiving means including an outer tubular wall and an end wall fixed to and extending across said outer tubular wall distant from said inlet and formed with an opening which passes through said end wall, said tubular receiving means placing said gaseous fluid in contact with the washing liquid as said gaseous fluid flows toward said end wall so that the gaseous fluid is in a wetted condition when reaching the region of said end wall, internal radial blower means situated in said tubular receiving means adjacent said end wall thereof for separating droplets from the wetted gaseous fluid in said tubular receiving means, external radial blower means situated outside of said tubular receiving means adjacent said end wall thereof for providing a flow of purified gas radially from said external blower means, said external blower means being coaxial with and having a diameter greater than that of said internal blower means, and both of said blower means having central suction regions while a common axis of both of said blower means is substantially perpendicular to said end wall, and connecting tubular means fluid-tightly connected with both of said blower means and passing through said opening in said end wall of said tubular receiving means, said connecting tubular means having a hollow interior communicating fluid-tightly with the interiors of both of said blower means at said central suction regions thereof, so that gas from which droplets have been removed by said internal blower means flows from the latter through said connecting tubular means to said external blower means to be radially discharged thereby, said internal and external radial blower means respectively including outer end plates which are distant from each other and inner end plates which are situated between and spaced from said outer end plates, with said end wall of said tubular receiving means extending between said inner end plates and surrounding said connecting tubular means, each of said blower means including a plurality of blower vanes extending between and fixed to said inner and outer end plates thereof, said inner end plates of both of said blower means respectively being formed with central openings respectively situated at said central suction regions thereof, and said connecting tubular means being coaxial with said internal and external blower means while extending between and being fixed to said inner end plates for providing communication between said internal and external blower means from said central opening of said inner end plate of said internal blower means, through said connecting tubular means, and into said external blower means through said central opening of said inner end plate thereof, whereby said internal and external blower means and said connecting tubular means form a single rotary unit through which the gaseous fluid flows while being confined therein without being required to travel with respect to any surfaces with respect to which said unit rotates, and drive means operatively connected to said unit for rotating the latter about said axis.

2. The combination of claim 1 and washing-liquid supply pipe means extending into said tubular receiving means and terminating in a discharge outlet closely adjacent to said outer end plate of said internal blower means at the exterior thereof for discharging washing liquid against said outer end plate of said internal blower means.

3. The combination of claim 2 and wherein said discharge outlet includes spray nozzles.

4. The combination of claim 2 and wherein a plurality of distributor vanes are fixed to and project from said outer end plate of said internal blower means at the exterior thereof and are situated at least in part between said latter end plate and discharge outlet of said washing-liquid supply pipe means for distributing washing liquid flowing from said supply pipe means along said outer end plate of said internal blower means into the interior of said tubular receiving means.

5. The combination of claim 4 and wherein a single drive shaft is fixed to said unit extending along said common axis thereof, coaxially therewith, and said drive means being operatively connected to said drive shaft for rotating the latter so as to rotate said unit about said axis thereof.

6. The combination of claim 4 and wherein said supply pipe means and distributor vanes cooperate at the region of said discharge outlet of said supply pipe means in a manner similar to a centrifugal pump, for sucking the washing liquid through said supply pipe means toward said outer end plate of said internal blower means, and means forming a circulating path along which washing liquid flows from said tubular receiving means back to said supply pipe means while being pumped by the suction in said supply pipe means.

* * * * *